US012429450B2

(12) United States Patent
Takeuchi

(10) Patent No.: US 12,429,450 B2
(45) Date of Patent: Sep. 30, 2025

(54) METHOD FOR MANUFACTURING ION SENSOR, AND ELECTRODE BODY FOR ION SENSOR

(71) Applicant: Hitachi High-Tech Corporation, Tokyo (JP)

(72) Inventor: Takanori Takeuchi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 375 days.

(21) Appl. No.: 18/015,636

(22) PCT Filed: Mar. 11, 2021

(86) PCT No.: PCT/JP2021/009783
§ 371 (c)(1),
(2) Date: Jan. 11, 2023

(87) PCT Pub. No.: WO2022/014095
PCT Pub. Date: Jan. 20, 2022

(65) Prior Publication Data
US 2023/0314361 A1    Oct. 5, 2023

(30) Foreign Application Priority Data
Jul. 16, 2020    (JP) ................................. 2020-121933

(51) Int. Cl.
*G01N 27/333*    (2006.01)
(52) U.S. Cl.
CPC .................................. *G01N 27/333* (2013.01)
(58) Field of Classification Search
CPC .................................................... G01N 27/333
See application file for complete search history.

(56) References Cited

U.S. PATENT DOCUMENTS

| 4,459,199 A | * | 7/1984 | Fletcher, III | ......... | G01N 27/333 |
| | | | | | 204/415 |
| 4,687,500 A | * | 8/1987 | Gelo | ...................... | G01N 27/36 |
| | | | | | 65/36 |
| 6,110,338 A | | 8/2000 | Rokugawa | | |

FOREIGN PATENT DOCUMENTS

| CN | 85 1 07084 A | 4/1987 |
| JP | 55-9138 A | 1/1980 |
| JP | 59-102153 A | 6/1984 |

(Continued)

OTHER PUBLICATIONS

JP 2009/066820 machine translation (Year: 2009).*

(Continued)

*Primary Examiner* — C. Sun
(74) *Attorney, Agent, or Firm* — Crowell & Moring LLP

(57) ABSTRACT

A method for manufacturing an ion sensor is provided in which an ion-sensitive film is adhered to an electrode body that accommodates an internal solution and has an internal electrode. The method includes an application step for applying water to a placement surface of the electrode body on which the ion-sensitive film is to be placed; a placement step for placing the ion-sensitive film in a state in which water is present on the placement surface; a pressurizing step for pressurizing the ion-sensitive film from the opposite side of the electrode body; and an irradiation step for irradiating a laser beam from the opposite side of the electrode body in a state in which the ion-sensitive film is pressed against the electrode body.

5 Claims, 8 Drawing Sheets

(56) References Cited

FOREIGN PATENT DOCUMENTS

| | | |
|---|---|---|
| JP | 60-10163 A | 1/1985 |
| JP | 7-29457 U | 6/1995 |
| JP | 9-5293 A | 1/1997 |
| JP | 9-210949 A | 8/1997 |
| JP | 11-132991 A | 5/1999 |
| JP | 11-295261 A | 10/1999 |
| JP | 2009-66820 A | 4/2009 |
| JP | 2018-205034 A | 12/2018 |
| KR | 10-0474880 B1 | 2/2005 |

OTHER PUBLICATIONS

C3 Chinese-language Office Action issued in Chinese Application No. 202180039765.4 dated Nov. 20, 2024, with partial English translation (18 pages).

International Search Report (PCT/ISA/210) issued in PCT Application No. PCT/JP2021/009783 dated May 18, 2021 with English translation (seven (7) pages).

Japanese-language Written Opinion (PCT/ISA/237) issued in PCT Application No. PCT/JP2021/009783 dated May 18, 2021 (three (3) pages).

\* cited by examiner

[FIG. 1]
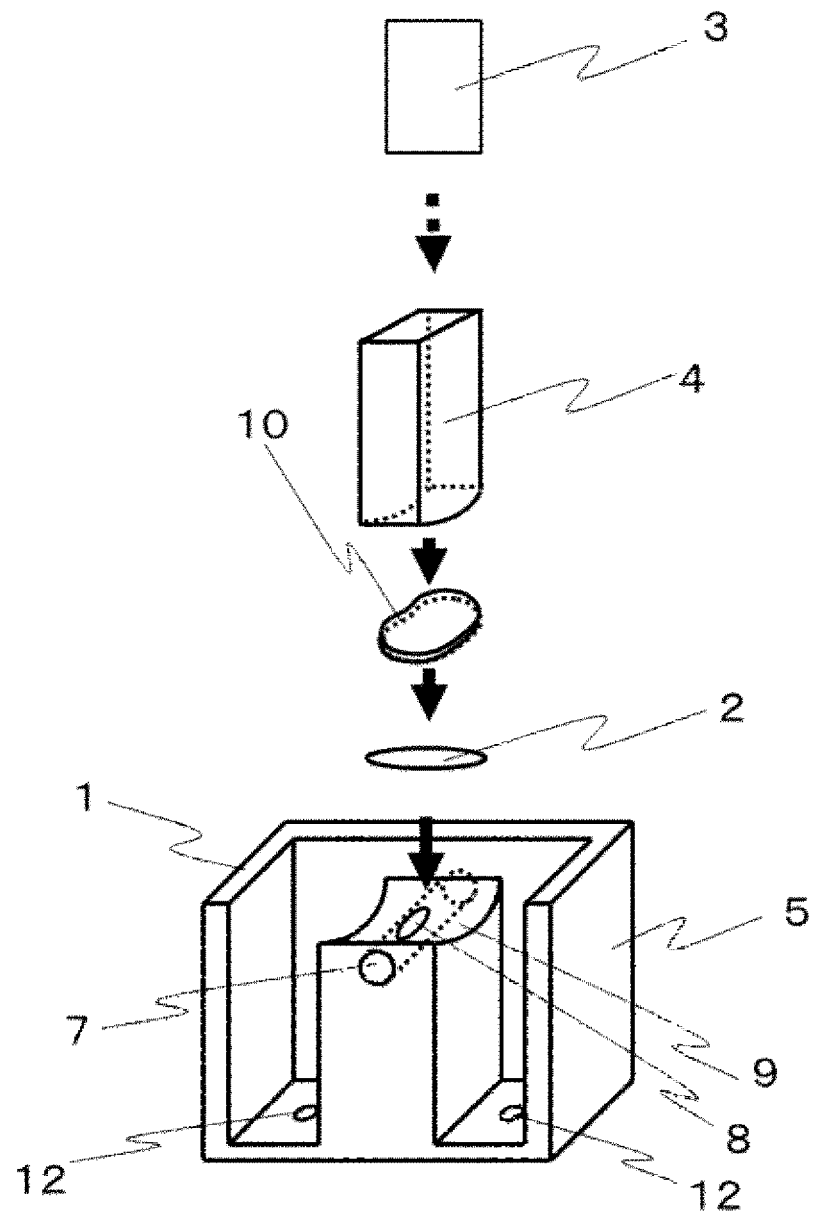

[FIG. 2]
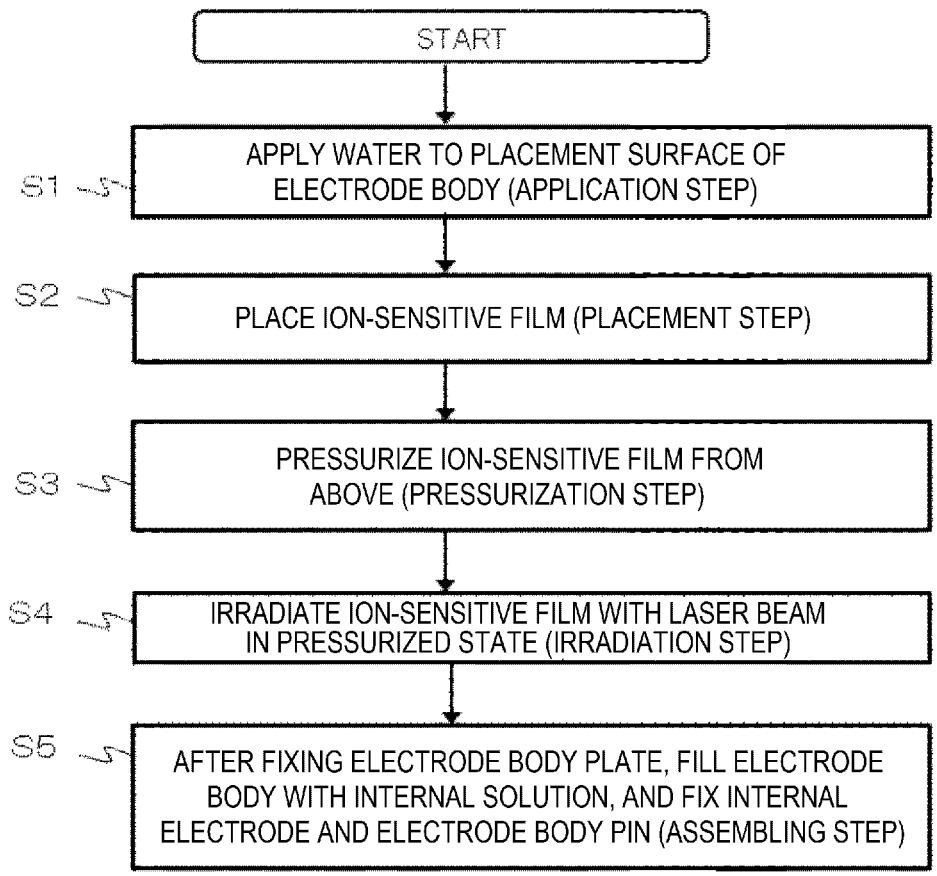

[FIG. 3]
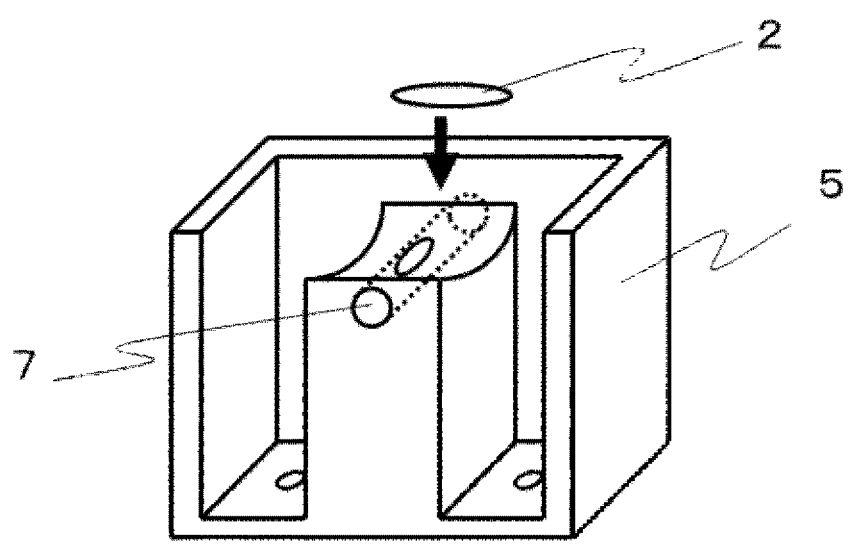

[FIG. 4]
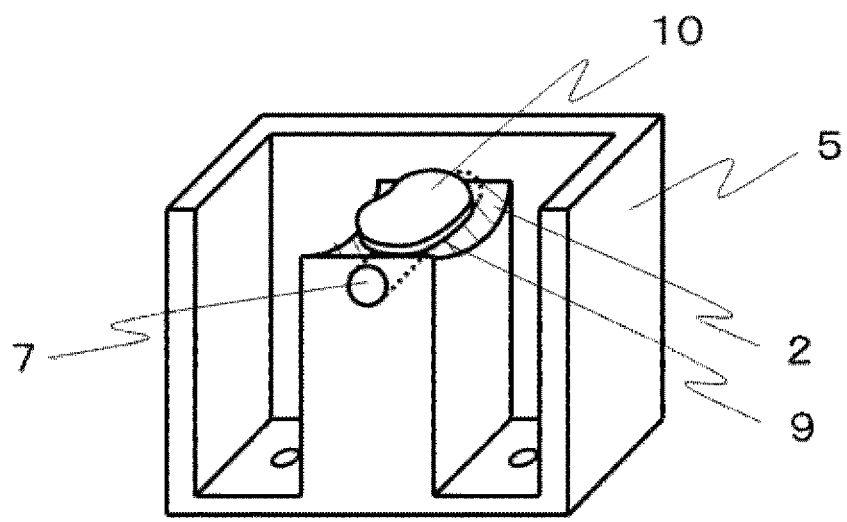

[FIG. 5]
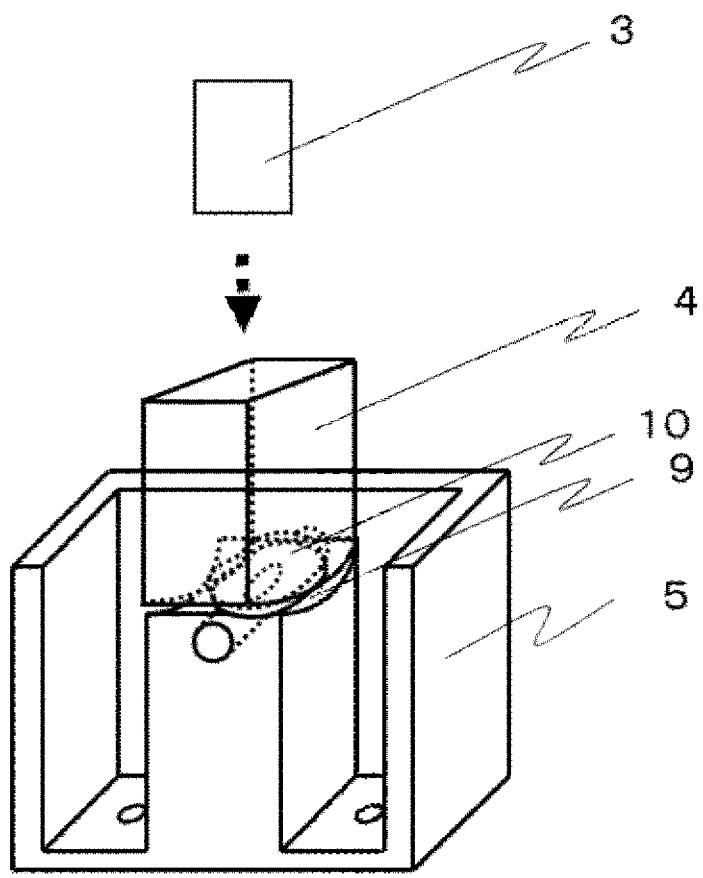

[FIG. 6]
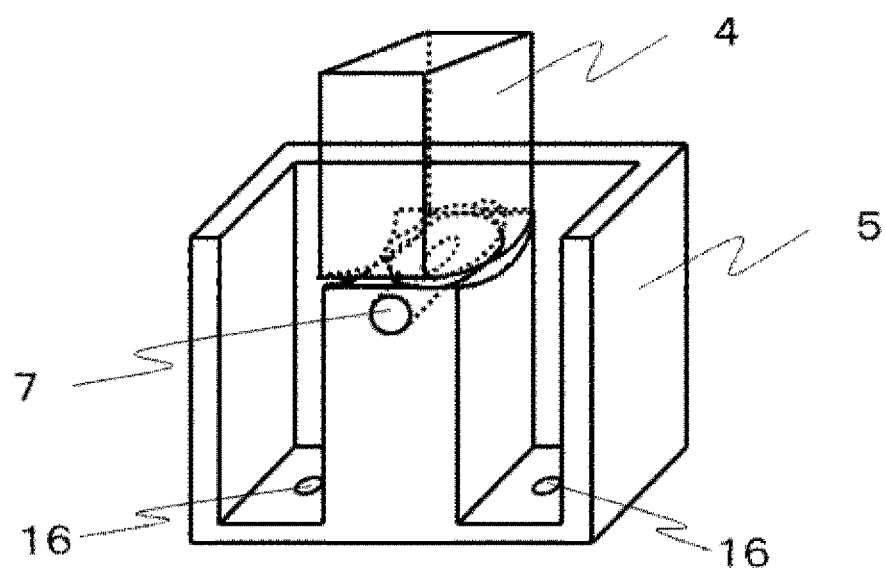

[FIG. 7]
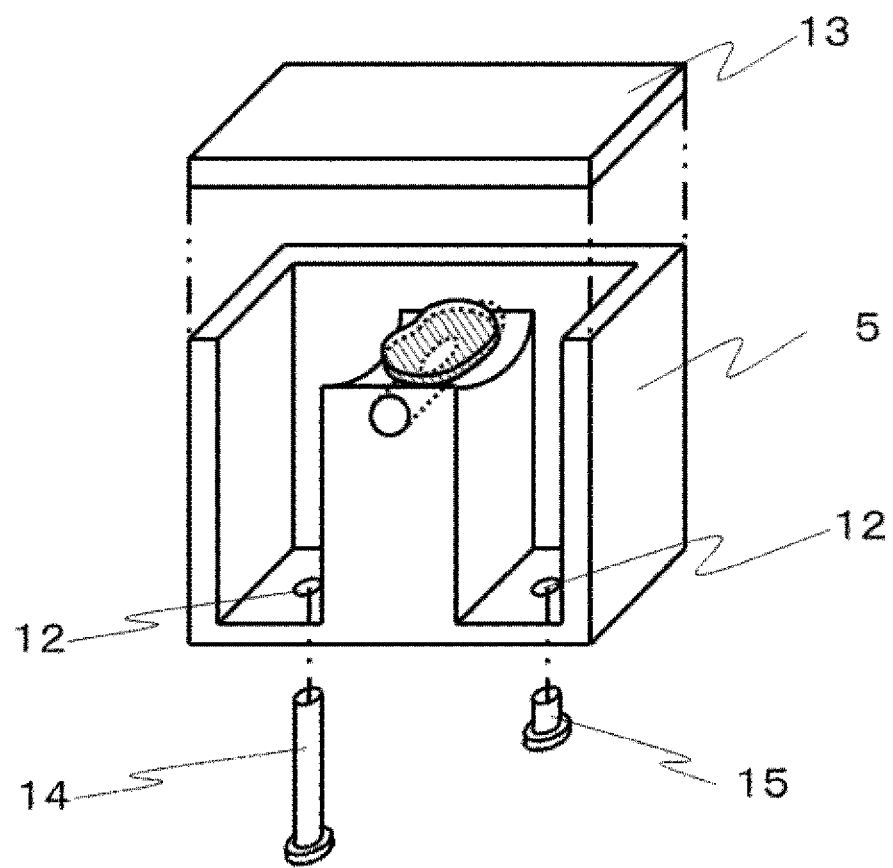

METHOD FOR MANUFACTURING ION SENSOR, AND ELECTRODE BODY FOR ION SENSOR

TECHNICAL FIELD

The present invention relates to a method for manufacturing an ion sensor and an electrode member for an ion sensor.

BACKGROUND ART

An ion sensor is used together with a reference electrode to measure a concentration of an ionic electrolyte in a sample, and is used by being mounted on an analysis device such as a clinical analysis device, a water quality analysis device, a soil analysis device, or a food analysis device.

As an ion-sensitive film formed on a sensitive surface of the ion sensor, a film is known in the related art, which is obtained by, with a hydrophobic organic polymer such as polyvinyl chloride serving as a base, appropriately adding a plasticizer such as dibutyl phthalate (DBP), dipropyl phthalate (DPP), or 2-nitrophenyl octyl ether (NPOE) to the base, and mixing the base with an ion-sensitive substance such as valinomycin or a macrocyclic polyether derivative.

The ion-sensitive film is prepared by applying a solvent solution, in which the organic polymer serving as the base of the ion-sensitive film and the ion-sensitive substance are dissolved in a volatile solvent at a predetermined ratio, to the sensitive surface of the ion sensor by brush application, dipping, dropwise adding, or the like so as to form an application film of the solution first, and then causing evaporation of the solvent to proceed while applying a stress in a direction of the sensitive surface. In this manner, when the solvent is evaporated while applying the stress as compared with a case of simple application and drying, an ion-sensitive film having a fairly smooth surface can be obtained, and an ion sensor in which an adverse effect due to adhesion of protein or the like is significantly prevented can be obtained.

The ion sensor generally (for example, PTL 1) includes an electrode body, an internal solution, an ion-sensitive film, and an internal electrode. Here, the electrode body of a flow-type ion sensor includes a specimen flow path, and a through hole is provided in a part of a side surface of the specimen flow path. Then, the through hole is covered with the ion-sensitive film so as to form a response surface, and the ion-sensitive film and the electrode body are bonded to each other at a portion other than the response surface.

CITATION LIST

Patent Literature

PTL 1: JPH11-132991A

SUMMARY OF INVENTION

Technical Problem

A bonding operation of the ion-sensitive film and the electrode body is performed by dissolving the organic polymer that constitutes the ion-sensitive film and the electrode body once using a volatile solvent such as tetrahydrofuran (THF) at a bonding interface of the ion-sensitive film and the electrode body, and then evaporating the volatile solvent.

Here, as a result of investigating a shape of the electrode body and a shape of the ion-sensitive film of the ion sensor and performance of the ion sensor, the inventors have noticed the following problems. That is, there are problems in that a bonding strength between the electrode body and the ion-sensitive film is weak and a response surface is easily peeled off due to a material variation in the electrode body and the ion-sensitive film, and a performance failure easily occurs when the response surface is peeled off.

An object of the invention is to provide a method for manufacturing an ion sensor and an electrode member for an ion sensor, in which a bonding strength between the electrode body and an ion-sensitive film is improved regardless of a material variation so as to reduce occurrence of a performance failure.

Solution to Problem

To solve the above problems, the invention provides a method for manufacturing an ion sensor in which an ion-sensitive film is bonded to an electrode member accommodating an internal solution and including an internal electrode. The method for manufacturing an ion sensor includes: an application step of applying water to a placement surface of an electrode body, in the electrode member, on which the ion-sensitive film is to be placed; a placement step of placing the ion-sensitive film in a state in which water is present on the placement surface; a pressurization step of pressurizing the ion-sensitive film from a side opposite to the electrode body; and an irradiation step of irradiating the ion-sensitive film with a laser beam from the side opposite to the electrode body in a state in which the ion-sensitive film is pressed against the electrode body.

An electrode member for an ion sensor includes an internal electrode configured to output potential generated in an ion-sensitive film, and an electrode body accommodating an internal solution configured to electrically conduct the internal electrode and the ion-sensitive film. The electrode body includes a flow path through which a liquid containing a specimen to be measured flows, and a placement surface on which the ion-sensitive film is to be placed. A through portion that is exposed to the placement surface and brings the specimen into contact with the ion-sensitive film is formed at a predetermined position on an upper surface of the flow path. The ion-sensitive film and the placement surface are bonded to each other by pressurization and laser beam irradiation from above the ion-sensitive film in a state in which water is present in the placement surface other than the through portion.

Advantageous Effects of Invention

According to the invention, it is possible to provide a method for manufacturing an ion sensor and an electrode member for an ion sensor in which a bonding strength between the electrode body and an ion-sensitive film is improved regardless of a material variation so as to reduce occurrence of a performance failure.

BRIEF DESCRIPTION OF DRAWINGS

FIG. 1 is an overall view showing a method for manufacturing an ion sensor according to an embodiment of the invention.

FIG. 2 is a flowchart showing the method for manufacturing an ion sensor according to the embodiment of the invention.

FIG. 3 is a view showing an application step in step S1 of FIG. 2.

FIG. 4 is a view showing a placement step in step S2 of FIG. 2.

FIG. 5 is a view showing a pressurization step in step S3 of FIG. 2.

FIG. 6 is a view showing an irradiation step in step S4 of FIG. 2.

FIG. 7 is a view showing an assembling step in step S5 of FIG. 2.

FIGS. 8A and 8B are views showing states of a surface facing an electrode body and an ion-sensitive film, in which FIG. 8A shows a case in which water 2 is not used as in a comparative example, and FIG. 8B shows a case in which water 2 is used as in the present embodiment.

DESCRIPTION OF EMBODIMENTS

Figures 8A, 8B:
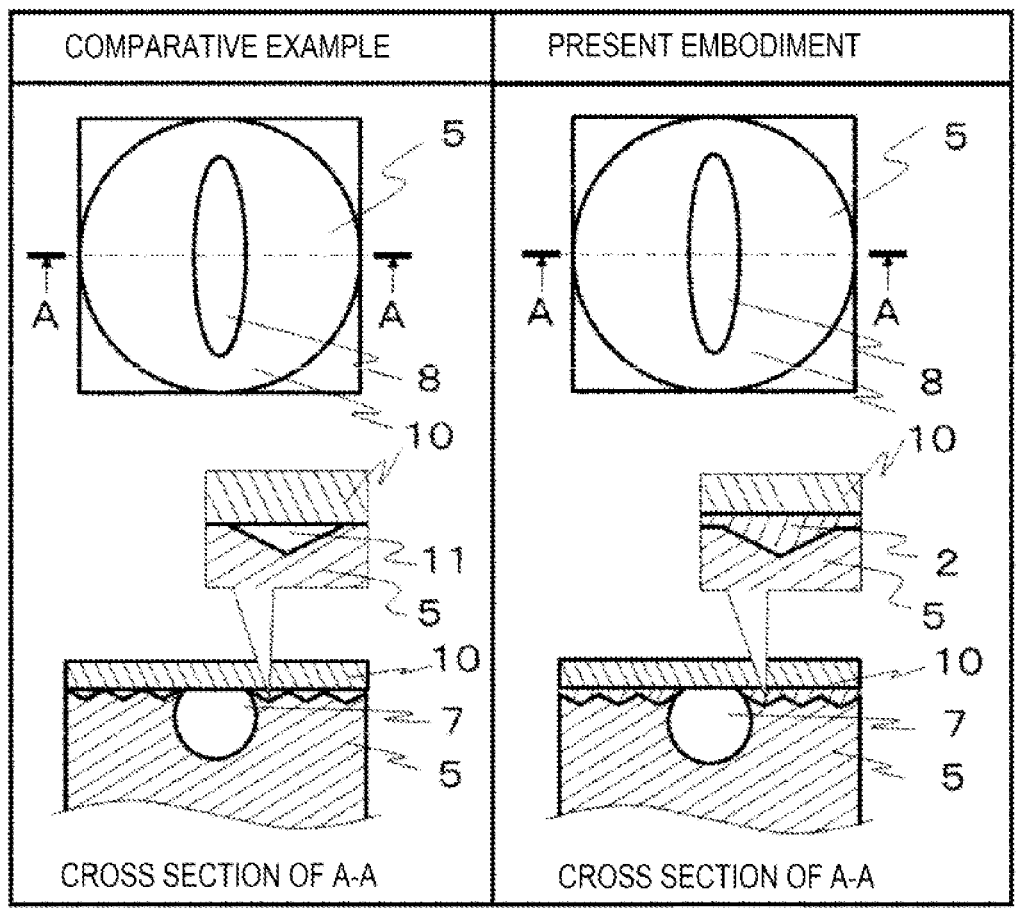

Hereinafter, an embodiment of the invention will be described in detail with reference to the drawings.

FIG. 1 is an overall view showing an outline of a method for manufacturing an ion sensor 1 according to the present embodiment. In the method for manufacturing the ion sensor 1 according to the present embodiment, water 2, a laser irradiator 3, and a weight 4 are used. In an electrode body 5, although a wall surface on a front side, which facilitates understanding of the present embodiment, is not shown, the wall surface similar to a wall surface on a back side is actually provided.

First, a configuration of an electrode member used in the ion sensor 1 will be described with reference to FIG. 7. The electrode member for an ion sensor includes an internal electrode 14 that outputs potential generated in an ion-sensitive film, an electrode body 5 accommodating an internal solution (not shown) that electrically conducts the internal electrode 14 and the ion-sensitive film 10, an electrode body pin 15 that seals the internal solution so as not to leak the internal solution, and an electrode body plate 13 that serves as a bottom surface accommodating an internal container.

Here, the electrode body 5 includes a specimen flow path 7 which is formed inside the electrode body 5 and through which a liquid containing a specimen to be measured flows, and a placement surface 9 (bonding surface) on which the ion-sensitive film 10 is to be placed. The electrode body 5 has a rectangular parallelepiped shape having an outer dimension of about 11 mm×20 mm×24 mm, the specimen flow path 7 has a diameter of about 1 mm, and the placement surface 9 has a size of about 5 mm×5 mm. In addition, a part of the specimen flow path 7 is formed with a through portion 8, which has an oval shape of about 0.9 mm×3 mm and is exposed to the placement surface 9 to bring the specimen into contact with the ion-sensitive film 10. Regarding a material of the electrode body 5, it is considered to use a thermoplastic resin or a hard resin containing a pigment for the entire electrode body 5. Alternatively, the pigment may be applied to the placement surface 9 of the electrode body 5 separately from a main body of the electrode body formed of the hard resin. In this manner, as a material that easily generates thermal energy, a material having a melting point lower than that of the ion-sensitive film is preferably used for at least the placement surface 9 of the electrode body 5.

Next, a method for manufacturing the ion sensor 1 will be described in detail with reference to FIGS. 2 to 7. FIG. 2 is a flowchart showing the method for manufacturing an ion sensor, and FIGS. 3 to 7 are views showing steps in the method for manufacturing an ion sensor.

First, the water 2 is applied to the placement surface 9 of the electrode body 5 (step S1). FIG. 3 is a view showing the application step in step S1. Since the water applied to the placement surface 9 is held on a surface of the placement surface 9 by surface tension, the water does not flow down from the through portion 8 to the specimen flow path.

Next, the ion-sensitive film 10 is placed onto the placement surface 9 of the electrode body 5 from above in a state in which the water 2 is present in the placement surface 9 other than the through portion 8 (before the water 2 is evaporated and disappears) (step S2). FIG. 4 is a view showing the placement step in step S2. Here, the ion-sensitive film 10 is formed of a soft or hard resin material having a diameter of 5 mm and a thickness of about 0.1 mm to 0.5 mm. The ion-sensitive film 10 transmits a wavelength in a far-infrared region and has a melting point higher than that of the electrode body 5 on the placement surface 9.

Thereafter, the ion-sensitive film 10 is pressurized from a side opposite to the electrode body 5 (step S3). FIG. 5 is a view showing the pressurization step in step S3. In the pressurization step, the weight 4 is used, and the ion-sensitive film 10 is pressed, by the weight 4, against the placement surface 9 of the electrode body 5 in a vertical direction with the water 2 interposed between the ion-sensitive film 10 and the placement surface 9. A force applied to the entire ion-sensitive film 10 by the weight 4 is about 10 N to 100 N, so that adhesion between the ion-sensitive film 10, the water 2, and the electrode body 5 is improved. Here, in addition to transparent glass such as quartz glass, ceramic and the like are also considered to be a material of the weight 4 as long as a wavelength in the far-infrared region is allowed to transmit the material, and the material is not limited thereto. In addition, a lower end surface of the weight 4, which is a side in contact with the ion-sensitive film 10, has approximately the same size as that of the placement surface 9 of the electrode body 5 and has a shape similar to that of the placement surface 9. The pressurizing force may be obtained not only by the gravity of the weight 4 itself but also by using an external force provided by, such as a servo motor.

In subsequent steps, the ion-sensitive film 10 is irradiated with a laser beam from above (the side opposite to the electrode body 5) in a state in which the ion-sensitive film 10 is pressed against the placement surface 9 (step S4). FIG. 6 is a view showing the irradiation step in step S4. The laser beam has a wavelength that is in the far-infrared region and is emitted from the laser irradiator 3. When the entire placement surface 9 or the entire weight 4 is irradiated with the laser beam, energy of the laser beam is converted into thermal energy, and the placement surface 9 of the electrode body 5 is melted by heat generation. At this time, since a gap between a surface facing the ion-sensitive film 10 and the electrode body 5 is filled with the water applied in the application step in step S1, the heat generated by the laser beam irradiation spreads over the placement surface 9. An irradiation time of the laser beam is preferably about 1 second to 20 seconds in consideration of a time until which the placement surface 9 of the electrode body 5 is melted and cured. The irradiation step is performed while the pressurization step in step S3 is continued, and the ion-sensitive film 10 is pressed against the placement surface 9 in a melted state, and thus the ion-sensitive film 10 and the placement surface 9 are easily bonded to each other. Further, by performing the pressurization step for about 1 second to 20 seconds as well after the irradiation step is completed, a bonding strength with the ion-sensitive film 10 is also improved for the placement surface 9 near the through portion 8.

When the irradiation step and the pressurization step are completed, a final assembling step of the ion sensor 1 is started (step S5). FIG. 7 is a view showing the assembling step in step S5. In the assembling step, first, the electrode body plate 13 is bonded and fixed to the electrode body 5, and the electrode body 5 is filled with the internal solution from hole portions 12. Further, after the internal electrode 14 is inserted through one hole portion 12 and bonded and fixed to the electrode body 5, the electrode body pin 15 is inserted through the other hole portion 12 and bonded and fixed to the electrode body 5. Thus, the manufacturing of the ion sensor 1 is completed.

Hereinafter, effects of the water 2 in the method for manufacturing the ion sensor 1 according to the present embodiment will be described. (a) of FIG. 8 and (b) of FIG. 8 are views showing states of the surface facing the electrode body 5 and the ion-sensitive film 10 when the ion-sensitive film 10 is pressurized with the weight 4, in which (a) of FIG. 8 shows a case in which the water 2 is not used as in a comparative example, and (b) of FIG. 8 shows a case in which the water 2 is used as in the present embodiment. Here, a case in which there is a variation in the material of the electrode body 5 and unevenness is generated on the placement surface 9 will be described as an example, but the same applies to a case in which there is a variation in the material of the ion-sensitive film 10.

First, in the case in which the water 2 is not used as in the comparative example, as shown in (a) of FIG. 8, since a gap 11 is present, it is difficult to uniformly transfer the thermal energy toward between the electrode body 5 and the ion-sensitive film 10 even when the laser irradiator 3 emits the laser beam.

On the other hand, in the present embodiment, as shown in (b) of FIG. 8, since the gap between the electrode body 5 and the ion-sensitive film 10 is filled with the water 2, the thermal energy is uniformly transferred when the laser beam is emitted. Here, although the water 2 itself is evaporated by heat, melting on the placement surface 9 of the electrode body 5 is uniformly promoted, and the adhesion between the electrode body 5 and the ion-sensitive film 10 is improved. As a result, according to the present embodiment, even when the electrode body 5 has a material variation, the bonding strength between the electrode body 5 and the ion-sensitive film 10 is increased, and thus it is possible to prevent a performance failure due to peeling of a response surface and to obtain stability of quality and a high yield rate.

The above embodiment is described in detail for better understanding of the invention, and the invention is not necessarily limited to those including all configurations described above. Further, a part of the configuration of the embodiment may be added, deleted, or replaced with another configuration.

REFERENCE SIGNS LIST

1: ion sensor
2: water
3: laser irradiator
4: weight
5: electrode body
7: specimen flow path
8: through portion
9: placement surface
10: ion-sensitive film
11: gap
12: hole portion
13: electrode body plate
14: internal electrode
15: electrode body pin

The invention claimed is:

1. A method for manufacturing an ion sensor in which an ion-sensitive film is bonded to an electrode member accommodating an internal solution and including an internal electrode, the method for manufacturing an ion sensor comprising:
   an application step of applying water to a placement surface of an electrode body, in the electrode member, on which the ion-sensitive film is to be placed;
   a placement step of placing the ion-sensitive film in a state in which water is present on the placement surface;
   a pressurization step of pressurizing the ion-sensitive film from a side opposite to the electrode body; and
   an irradiation step of irradiating the ion-sensitive film with a laser beam from the side opposite to the electrode body in a state in which the ion-sensitive film is pressed against the electrode body;
   wherein a weight that transmits the laser beam is used in the pressurization step; and
   wherein the irradiation step is performed while the pressurization step is continued.

2. The method for manufacturing an ion sensor according to claim 1, wherein
   a melting point of the placement surface of the electrode body is lower than that of the ion-sensitive film.

3. The method for manufacturing an ion sensor according to claim 2, wherein
   the placement surface of the electrode body is provided with a material different from that of a main body of the electrode body.

4. The method for manufacturing an ion sensor according to claim 1, wherein a force applied to the ion-sensitive film by the weight is between 10 N and 100 N.

5. The method for manufacturing an ion sensor according to claim 1, wherein
   the weight is a transparent glass material.

* * * * *